United States Patent [19]

Pellon et al.

[11] 4,242,247
[45] Dec. 30, 1980

[54] PROCESS FOR WATER-IN-OIL EMULSIONS OF WATER-SOLUBLE POLYMERS

[75] Inventors: Joseph J. Pellon, New Canaan, Conn.; Paul D. Savoy, Meterie, La.

[73] Assignee: American Cyanamid Company, Stamford, Conn.

[21] Appl. No.: 69,673

[22] Filed: Aug. 27, 1979

Related U.S. Application Data

[63] Continuation of Ser. No. 946,686, Sep. 28, 1978, abandoned.

[51] Int. Cl.$^3$ .............................................. C08K 3/30
[52] U.S. Cl. ........................................ 260/29.6 WQ
[58] Field of Search .................. 260/29.6 H, 29.6 Z, 260/29.6 WQ; 526/234; 528/488, 486

[56] References Cited

U.S. PATENT DOCUMENTS

| | | | |
|---|---|---|---|
| 3,766,120 | 10/1973 | Gershberg | 260/29.6 Z |
| 4,037,040 | 7/1977 | Trapasso | 260/29.6 WQ |
| 4,073,763 | 2/1978 | Tai | 260/29.6 Z |

Primary Examiner—Paul R. Michl
Attorney, Agent, or Firm—Paul W. Leuzzi, II

[57] ABSTRACT

Reduced coagulum is obtained when water-soluble monomers are polymerized in the dispersed phase of a water-in-oil emulsion and added salt is present in the aqueous monomer phase.

10 Claims, No Drawings

PROCESS FOR WATER-IN-OIL EMULSIONS OF WATER-SOLUBLE POLYMERS

This is a continuation of application Ser. No. 946,686, filed Sept. 28, 1978, now abandoned.

This invention relates to an improved process for preparing a water-soluble polymer in the disperse phase of a water-in-oil emulsion. More particularly, this invention relates to such a process wherein the amount of coagulum associated with such conventional preparations is greatly reduced.

Water-soluble polymers derived from water-soluble monomers are typically prepared in aqueous solution. However, many of the polymers thus prepared are obtained as rigid gels which must be further processed to provide useful products. Typically the water-polymer gel is dried and comminuted to provide a powdered solid which is then dissolved in water for use. The polymer can only be prepared in dilute aqueous solution, usually one weight percent or less, without reforming a gel structure. Preparation of the dilute solution must be carefully conducted and requires extensive time periods. For many applications, the dilute solutions must be prepared at locations remote from the site of utilization and entails shipping large volumes of water for very small quantities of useful polymers.

In order to overcome the problems associated with these gel polymers and their aqueous solutions, recent developments have led to preparation of the polymers in the disperse phase of a water-in-oil emulsion. In this procedure, the monoer content from which the polymer is derived is dissolved in water and the resulting aqueous monomer solution is emulsified in a suitable oil to form a water-in-oil emulsion. Polymerization is then conducted to provide the desired polymer in the dispersed aqueous phase and the resulting water-in-oil emulsion is the product desired. For use in those applications wherein water-soluble polymers are effective, the emulsion is inverted to an oil-in-water emulsion, usually at the point of application to an oil-in-water emulsion, usually at the point of application, and the polymer is released to the continuous aqueous phase wherein it readily dissolves. An inverting agent is employed which may be present in the original emulsion or subsequently added. Since the emulsion is inverted in large quantities of water, usually at useful doses, the concentration of polymer being inverted is insufficient to produce a gel upon dissolution.

For many applications involving water-soluble polymers, these water-in-oil emulsions have become the preferred product type and extensive production thereof has resulted. Certain problems are encountered in their production which reduce production capacity, increase production costs, and otherwise complicate production. A difficult problem that arises in production of the water-in-oil emulsions of water-soluble polymers is the excessive amount of coagulum that results. This coagulum must be removed following each batch preparation to prevent even greater coagulum formation in subsequent batches. Such coagulum formation and removal reduces the effective amount of polymer provided, diminishes available reactor time due to the tedious clean-up operations involved and increases production costs. Continuous procedures for preparation of such water-in-oil emulsions have not yet been developed but their success would also appear to necessitate minimizing coagulum problems.

Accordingly, what is needed is an improved process for preparing water-in-oil emulsions of water-soluble polymers wherein the amount of coagulum formed is reduced. Such a provision would satisfy a long-felt need and constitute a significant advance in the art.

In accordance with the present invention, there is provided a process for preparing a water-soluble polymer of nonionic or anionic character which comprises preparing an aqueous solution of at least one water-soluble monomer, said aqueous solution containing dissolved therein from about 2 weight percent up to the solubility limit in water of a water-soluble, oil-insoluble salt, emulsifying the resulting monomer solution in a water-insoluble hydrocarbon oil to form a waterin-oil emulsion, and polymerizing said monomer in the dispersed phase to form the desired polymer.

The process of the present invention provides the desired water-in-oil water-soluble polymer emulsions with a greatly reduced amount of coagulum compared to former processes. Unexpectedly, the process of the present invention is effective in such preparation wherein the water-soluble polymer is nonionic or anionic in character but is not effective wherein the water-soluble polymer is cationic in character.

In carrying out the process of the present invention, the only departures from conventional processing to provide the water-in-oil emulsions containing water-soluble polymer in the dispersed phase are those of adding sufficient quantities of salt to the aqueous monomer solution and of employing only those monomers that form nonionic or anionic polymers. Thus, no new teachings are necessary as to the emulsion preparation or polymerization reaction and the like. Since cationic monomers form cationic polymers, such monomers should not be used.

As to the salt provision, which is the novel feature of the process of the present invention, any ionizable water-soluble salt that is oil-insoluble may be used. Typical useful salts include sodium sulfate, sodium chloride, ammonium chloride, ammonium sulfate, etc. that are suitably water-soluble and oil-insoluble and do not interfere with the polymerization reaction. Certain water-soluble organic salts organic salts such as sodium acetate and the like may also be used. Preferably, sodium sulfate is employed because of its ionic strength, low cost, and availability.

The amount of salt that is added to the water in which the monomer content is dissolved will vary widely depending upon a number of variables such as the particular salt used, the specific monomer content employed, the initiator system used to effect polymerization and the like. Gernerally, the amount of salt employed will vary from about 2 weight percent based on the aqueous phase up to about the full solubility level of the salt in the water phase, perferably about 2 to 5 weight percent based on the aqueous phase.

As indicated, the process of the present invention is applicable to those conventional water-soluble monomers used to prepare water-soluble nonionic and anionic polymers in the aqueous phase of a water-in-oil emulsion. Preferred monomers include acrylamide along or acrylamide and acrylic acid with acrylic acid comprising up to about 50 percent of the acrylamide-acrylic acid charge.

The invention is more fully illustrated in the examples which follow wherein all parts and percentages are by weight unless otherwise specified.

The following general procedures and test methods were employed in the examples.

GENERAL PROCEDURE

Nonionic Polymer

*Oil Phase*

| | | |
|---|---|---|
| Low Odor Paraffin Solvent, LOPS (Exxon Corp.) | | 584 gm. |
| Sorbitan Mono-oleate (Arlacel 80 Atlas) | | 49 gm. |
| | TOTAL | 633 gm. |

*Aqueous Phase*

| | | |
|---|---|---|
| Aqueous Acrylamide (50%) | | 1268 gm. |
| Water (deionized) | | 336 gm. |
| Ethylenediaminetetra-acetic acid, disodium salt (EDTA) (5.6% Aqueous) | | 22.6 gm. |
| | TOTAL | 1626.6 gm. |

*Catalyst System*

*Separate Components*

*Oxidant*

| | |
|---|---|
| t-butylhydroperoxide (70X-Pennwalt) 2% aqueous | 3.2 gm. |

*Reducing Agent*

Sodium metabisulfite (0.04 to 0.4% aqueous) to provide 16-20% conversion per hour.

PROCEDURE

Add water to beaker containing acrylamide and EDTA and adjust to pH 5.0 if necessary. If salt is used, it is dissolved in the aqueous phase, preferably in the water prior to addition of other ingredients. The oxidant component of the catalyst system may be added to the aqueous phase as it is prepared or may be withheld for addition to the emulsion formed.

PREPARATION OF WATER-IN-OIL EMULSION

Add aqueous phase to oil phase using suitable homogenizer such as a Silverson Homogenizer. Homogenize at slow speed for several minutes, then at medium speed for additional minute or two. Viscosity of resulting emulsion should be about 500–1500 centipoises.

POLYMERIZATION

The emulsion is added to a 2.5 liter glass reactor with indentations or a stainless steel reactor with baffles. The emulsion is sub-surface sparged with nitrogen. If the t-butyl hydroperoxide was withheld from the aqueous phase used in preparing the emulsion, it is added to the emulsion and sparging is continued according to conventional procedure.

Sodium metabisulfite solution is then added continuously while maintaining a nitrogen blanket at a rate to provide about 20% conversion per hour. After about 50-90 minutes the temperature will rise to about 40° C. and this temperature is maintained throughout the remainder of the reaction. Conversion of greater than 98% monomer occurs in about 6.5 hours of reaction.

LOW ANIONIC POLYMER (3% acrylic acid)

The oil phase was prepared by dissolving sorbitan mono-oleate (15 gms.) in LOPS (179 gms.)

The separate aqueous phase was prepared by mixing acrylamide (50% aqueous) 375 gms., deionized water 105 gms., acrylic acid 5.9 gms., EDTA (5.6% solution) 6.9 gms., ammonia 4.8 gms. to adjust pH to 5.5 and t-butyl hydroperoxide (70X) 1.93% aqueous 1.0 gm. the aqueous phase was added to the oil phase and homogenized as described above.

Polymerization was carried out as described above except in a 1-liter stainless steel reactor.

HIGH ANIONIC POLYMER (30% Acrylic Acid)

The oil phase was prepared by dissolving 15.3 gms. of sorbitan mono-oleate in 177 gms. of LOPS.

The separate water phase was prepared by mixing acrylamide (50% aqueous) 264 gms., deionized water 138 gms., EDTA solution (5.6% aqueous) 13 gms., acrylic acid 56 gms., ammonia 28 gms. to pH 5.0, and t-butyl hydroperoxide (70X) 1.88% aqueous 1.0 gm.

Emulsification was as above.

Polymerization was carried out as described above except in a 1-liter stainless steel reactor.

COAGULUM DETERMINATION

*Bulk Coagulum*

Stir 100 ml. of oil/Arlacel 9/1 solution in 250 polyethylene beaker. While stirring, add 25 gm. emulsion to be analyzed. Stir 20–30 seconds to get uniform solution. Filter solution through weighed 150 mesh screen. Using wash bottle filled with oil/Arlacel solution, wash out beaker and drain through screen. Allow screen to dry 15 minutes, blot with paper towel and weigh. Determine coagulum as follows:

$$\% \text{ coagulum} = \frac{\text{weight increase of screen} \times 100}{\text{emulsion weight} \times \text{wt. fraction polymer (.28)}}$$

Since coagulum consists of polymer, water, oil, etc., total % coagulum could be 357.

CUMULATIVE COAGULUM

Drain the reactor as thoroughly as possible. From the initial weights of the reactor and agitator and the corresponding weights after reactor run, calculate cumulative coagulum as follows:

$$\text{cumulative coagulum \%} = \frac{\text{weight increase} \times 100}{\text{emulsion weight} \times \text{wt. practice polymer (0.28)}}$$

Coagulum could be 357% as explained above.

EXAMPLE 1

The nonionic polymer was prepared according to the General Procedure described. Two glass reactors were run side-by-side. In comparative runs, no salt was employed in one reactor. In runs of the invention, 5% $Na_2SO_4$ based on the aqueous phase added prior to emulsifiction was employed in the second reactor. A consecutive series of preparations was made in each reactor without cleaning between preparations. Using salt in the aqueous phase, six preparations were made with 2.0% bulk coagulum and 7% cumulative coagulum in the sixth preparation. Without salt, 50% bulk coagulum (<5% cumultive) resulted after two preparations and the series was discontinued after the 2nd run because of the large quantity of coagulum already formed.

EXAMPLE 2

The procedure of Example 1 was repeated except that stainless steel reactors were used. With salt bulk coagulum was 2% and cumulative coagulum was 19% after three preparations. Without salt, cumulative coagulum was 100% after two preparations and the series was discontinued after the 2nd run because of the large quantity of coagulum.

EXAMPLE 3

The high anionic polymer was prepared according to the General Procedure described. Three 1l stainless steel reactors were run side-by-side, one with no salt, one with 2% salt, and one with 4% salt added to the aqueous phase prior to emulsification. The procedure was as in Example 1. Results are given in Table I.

TABLE I

COAGULUM REDUCTION USING SALT*

| Preparation No. | No Salt Cumulative % | 2% $Na_2SO_4$ Cumulative % | 4% $Na_2SO_4$ Cumulative % |
|---|---|---|---|
| 1 | 14 | 14 | 7 |
| 2 | 35 | 10 | 7 |
| 3(Stopped after 3 hrs) | 171 | | 23 |

*Coagulum in bulk less than 1% except where cumulative goes over 100%

The procedure of Example 3 was followed except that the low anionic polymer was prepared following the General Procedure. Results are given in Table II.

TABLE II

COAGULUM REDUCTION USING SALT*

| Preparation No. | No Salt Cumulative % | 2% $Na_2SO_4$ Cumulative % | 4% $Na_2SO_4$ Cumulative % |
|---|---|---|---|
| 1 | 18 | 4 | 9 |
| 2 | 103 | 32 | 21 |

*Coagulum in bulk < 10% except where cumulated goes over 100%

EXAMPLE 4

The procedure of Example 3 was repeated except that the anionic monomer content was increased to provide 50% of the monomer content. The oil phase was prepared by dissolving 18.9 grams of sorbitan mono-oleate in 187.1 grams oil (LOPS). The aqueous phase was prepared by admixture 225 grams (50% aqueous) acrylamide, 225 grams ammonium acrylate (61% aqueous, pH 7.5 with excess ammonia), deionized water 36 grams, EDTA solution (5.6% aqueous) 8 grams, and t-butyl hydroperoxide (70X) (2% aqueous) 1.0 gram. Emulsification was in accordance with General Procedure. Polymerization was carried out in two 1-liter stainless steel reactors, one using no salt and one using 4% $(NH_4)_2SO_4$. Total coagulum (cumulative plus bulk) after three funs without intermediate cleaning of the reactors were 109% without salt and 56% with salt.

EXAMPLE 5

The procedure of Example 2 was followed in every material detail except that 12% ammonium acela te was employed as the salt. Results after two runs without intermediate cleaning of the reactors were greater than 50% total coagulum with no salt and 14% total coagulum with salt.

EXAMPLE 6

The procedure of Example 2 was again repeated except that 13% $NH_4Cl$ was employed as the salt. Results after two runs without intermediate cleaning of the reactors were 31% salt and 11% with salt.

EXAMPLE 7

Again following the procedure of Example 2 except that 5% $(NH_4)SO_4$ was employed as salt, two sonsecutive runs were made without intermediate cleaning of the reactor, one series of runs conducted without salt in one stainless steel reactor and another series of runs conducted with salt as indicated in another stainless steel reactor. Results after the two runs were 49% total coagulum without salt and 21% total coagulum with salt.

COMPARATIVE EXAMPLE

The general procedure described for preparing low anionic polymers was followed except that a quaternary ammonium monomer salt was employed in place of the anionic monomer. Following the procedure of Example 4 using 1% or 5% cationic monomer with $Na_2SO_4$ as the added salt, no improvement in the amount of coagulum formed was obtained over the use of no added salt at 2% or 4% use level.

We claim:

1. A process for preparing a water-soluble polymer or copolymer of nonionic or anionic character which comprises preparing an aqueous solution of at least one water-soluble monomer, said aqueous solution containing dissolved therein from about 2 weight percent up to the solubility limit in water of a water-soluble, oil-insoluble added salt selected from the group consisting of sodium sulfate, sodium chloride, ammonium chloride, ammonium sulfate and sodium acetate, emulsifying the resulting monomer solution in a water-insoluble hydrocarbon oil to form a water-in-oil emulsion, and polymerizing said monomer in the dispersed phase to form the desired polymer.

2. The process of claim 1 wherein said monomer olution contains acrylamide.

3. The process of claim 1 wherein said monomer solution contains acrylamide and acrylic acid.

4. The process of claim 1 wherein said salt is $Na_2SO_4$.

5. The process of claim 3 wherein said monomer solution contains 97 weight percent acrylamide and 3 weight percent acrylic acid.

6. The process of claim 3 wherein said monomer solution contains 70 weight percent acrylamide and 30 weight percent acrylic acid.

7. The process of claim 1 wherein said preparation is repeated in the same reactor without intermediate cleaning thereof.

8. The process of claim 5 wherein said salt is $Na_2SO_4$.

9. The process of claim 6 wherein said salt is $Na_2SO_4$.

10. The process of claim 7 wherein said salt is $Na_2SO_4$.

* * * * *